(12) United States Patent
Mullangath (10) Patent No.: US 8,806,277 B1
(45) Date of Patent: Aug. 12, 2014

(54) SYSTEMS AND METHODS FOR FETCHING TROUBLESHOOTING DATA

(75) Inventor: Sinoj Mullangath, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 289 days.

(21) Appl. No.: 13/364,277

(22) Filed: Feb. 1, 2012

(51) Int. Cl.
*G06F 11/00* (2006.01)

(52) U.S. Cl.
USPC .......................................................... 714/26

(58) Field of Classification Search
USPC ................................................ 714/26, 37, 57
See application file for complete search history.

(56) References Cited

U.S. PATENT DOCUMENTS

| | | | | |
|---|---|---|---|---|
| 5,127,005 A * | 6/1992 | Oda et al. | ......................... | 714/26 |
| 5,272,704 A * | 12/1993 | Tong et al. | ...................... | 714/26 |
| 5,369,756 A * | 11/1994 | Imura et al. | ..................... | 714/26 |
| 5,587,930 A * | 12/1996 | Hori et al. | ...................... | 702/185 |
| 5,870,768 A * | 2/1999 | Hekmatpour | .................. | 715/207 |
| 6,738,933 B2 * | 5/2004 | Fraenkel et al. | ............. | 714/47.2 |
| 7,017,080 B1 * | 3/2006 | Liggesmeyer et al. | ......... | 714/26 |
| 7,096,459 B2 * | 8/2006 | Keller et al. | .................... | 717/124 |
| 7,437,611 B2 * | 10/2008 | Agarwal et al. | ................. | 714/26 |
| 7,770,052 B2 * | 8/2010 | King et al. | ........................ | 714/2 |
| 7,823,015 B2 * | 10/2010 | Liggesmeyer et al. | ......... | 714/25 |
| 8,381,036 B2 * | 2/2013 | Vidal et al. | .................... | 714/38.1 |
| 8,392,760 B2 * | 3/2013 | Kandula et al. | ................. | 714/26 |
| 2002/0083372 A1 * | 6/2002 | Adam | ............................. | 714/37 |
| 2003/0149919 A1 * | 8/2003 | Greenwald et al. | ............. | 714/43 |
| 2008/0065928 A1 * | 3/2008 | Suzuki et al. | ..................... | 714/3 |
| 2008/0133288 A1 * | 6/2008 | Thibaux et al. | .................... | 705/7 |
| 2008/0294946 A1 * | 11/2008 | Agarwal et al. | ................. | 714/57 |
| 2009/0055684 A1 * | 2/2009 | Jamjoom et al. | ................. | 714/26 |
| 2010/0049676 A1 * | 2/2010 | Devitt et al. | .................... | 706/12 |
| 2010/0174388 A1 * | 7/2010 | Ferreira et al. | .................. | 700/83 |
| 2010/0218030 A1 * | 8/2010 | Bhatnagar et al. | ................ | 714/2 |
| 2010/0218031 A1 * | 8/2010 | Agarwal et al. | ................... | 714/2 |
| 2010/0281307 A1 * | 11/2010 | Ng | .................................. | 714/40 |
| 2010/0318847 A1 * | 12/2010 | Beg et al. | ........................ | 714/26 |
| 2013/0185591 A1 * | 7/2013 | Ge et al. | ......................... | 714/26 |

OTHER PUBLICATIONS

Gruschke, Boris, Integrated Event Management: Event Correlation Using Dependency Graphs, 1998, University of Munich Department of Computer Science.*

George Candea et al.; Automatic Failure-Path Inference: A Generic Introspection Technique for Internet Applications; 3rd IEEE Workshop of Internet Applications (WIAPP); Jun. 2003.

* cited by examiner

*Primary Examiner* — Marc Duncan (74) *Attorney, Agent, or Firm* — ALG Intellectual Property, LLC (57) ABSTRACT

A computer-implemented method for fetching troubleshooting data may include 1) receiving a request for information describing at least one potential cause of a failure within a computing environment, and, in response to the request, 2) identifying a set of relationships between a plurality of subsystems within the computing environment, 3) identifying a plurality of potential causes of the failure based on the set of relationships, and 4) responding to the request by providing the plurality of potential causes of the failure. Various other methods, systems, and computer-readable media are also disclosed.

20 Claims, 7 Drawing Sheets

SYSTEMS AND METHODS FOR FETCHING TROUBLESHOOTING DATA

BACKGROUND

Modern computing environments may include a variety of interconnected applications, services, and/or resources. Accordingly, when an application or service fails, the failure may be traced back to one or more failures of other applications, services, and/or resources in the environment.

When an application or service fails, an administrator may use a troubleshooting system intended to facilitate the discovery of the underlying fault (or the "root cause" of the failure). For example, traditional troubleshooting systems may present an administrator with information about computing elements on which a failed application or service depends and allow the administrator to select one computing element for further investigation. Unfortunately, this approach may cause a remote administrator to wait for the information for each new selection to be fetched, thereby wasting the administrator's time and potentially delaying a resolution to the failure. Alternatively, traditional troubleshooting systems may fetch an entire dependency tree of a computing environment at once. Unfortunately, due to the potential size and complexity of some computing environments, fetching this information may consume a significant amount of time and resources, especially for a remote administrator operating from a mobile device with limited resources. Furthermore, displaying an entire dependency tree of a complex computing environment within the limited display of some mobile devices may provide a poor interface experience for an administrator. Accordingly, the systems and methods described herein identify and address a need for additional and improved systems and methods for fetching troubleshooting data.

SUMMARY

As will be described in greater detail below, the instant disclosure generally relates to systems and methods for fetching troubleshooting data by providing information about multiple possible causes of a failure (e.g., in response to a single request). In one example, a computer-implemented method for fetching troubleshooting data may include 1) receiving a request for information describing at least one potential cause of a failure within a computing environment, and, in response to the request, 2) identifying a set of relationships between a plurality of subsystems within the computing environment, 3) identifying a plurality of potential causes of the failure based on the set of relationships, and 4) responding to the request by providing the plurality of potential causes of the failure.

In some examples, receiving the request for information may include receiving the request from a mobile computing device. In these examples, responding to the request may include responding to the mobile computing device. Furthermore, providing the plurality of potential causes of the failure (e.g., in the response to the mobile computing device) may include providing the plurality of potential causes of the failure to the mobile computing device in a format configured to display subsystems within the plurality of subsystems that are implicated in one or more of the potential causes of failure within the plurality of potential causes of failure instead of each subsystem within the plurality of subsystems.

In some embodiments, identifying the plurality of potential causes of the failure may include iteratively generating a dependency tree starting from the failure by identifying each subsystem within the plurality of subsystems with a potential direct causal relationship to at least one of the failure and a previously identified subsystem within the dependency tree. In these embodiments, iteratively generating the dependency tree may include, for each node of the dependency tree, identifying a potential fault in the node relating to the failure and identifying each subsystem within the plurality of subsystems capable of contributing to the potential fault.

In one example, providing the plurality of potential causes of the failure may include providing a dependency tree starting from the failure and tracing a plurality of potential causal paths of the failure across a subset of the plurality of subsystems. Additionally or alternatively, responding to the request may include providing the plurality of potential causes of the failure in a single message. In some examples, responding to the request may include 1) selecting a subset of the plurality of subsystems that includes subsystems within the plurality of subsystems implicated in at least one potential cause within the plurality of potential causes, 2) selecting a subset of the set of relationships including relationships within the set of relationships implicated in at least one potential causes within the plurality of potential causes, and 3) transmitting the subset of the plurality of subsystems and the subset of the set of relationships without transmitting the plurality of subsystems and the set of relationships.

In one embodiment, a system for implementing the above-described method may include 1) a receiving module programmed to receive a request for information describing at least one potential cause of a failure within a computing environment, 2) an identification module programmed to, in response to the request, identify a set of relationships between a plurality of subsystems within the computing environment, 3) an analysis module programmed to identify a plurality of potential causes of the failure based on the set of relationships, and 4) a response module programmed to respond to the request by providing the plurality of potential causes of the failure. The system may also include at least one processor configured to execute the receiving module, the identification module, the analysis module, and the response module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) receive a request for information describing at least one potential cause of a failure within a computing environment, and, in response to the request, 2) identify a set of relationships between a plurality of subsystems within the computing environment, 3) identify a plurality of potential causes of the failure based on the set of relationships, and 4) respond to the request by providing the plurality of potential causes of the failure.

As will be explained in greater detail below, by providing information about multiple possible causes of a failure (e.g., in response to a single request), the systems and methods described herein may facilitate an efficient transfer of relevant troubleshooting information to an administrator. Accordingly, in some examples an administrator operating remotely (e.g., using a mobile computing device) may receive all relevant information about potential failure points at once rather than introducing a wait (e.g., due to latency of remote communications) at each step of an investigation into a failure. Additionally, in some examples, an administrator operating remotely may receive only relevant information, thereby decreasing time and resources consumed in transferring and loading the information and also potentially providing the information in a format that is more usable on mobile computing devices with limited display and/or interface capabilities. Furthermore, by providing information about multiple possible causes of a failure, the systems and methods described herein may provide more complete information than a root-cause analysis designed to find a single point of failure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
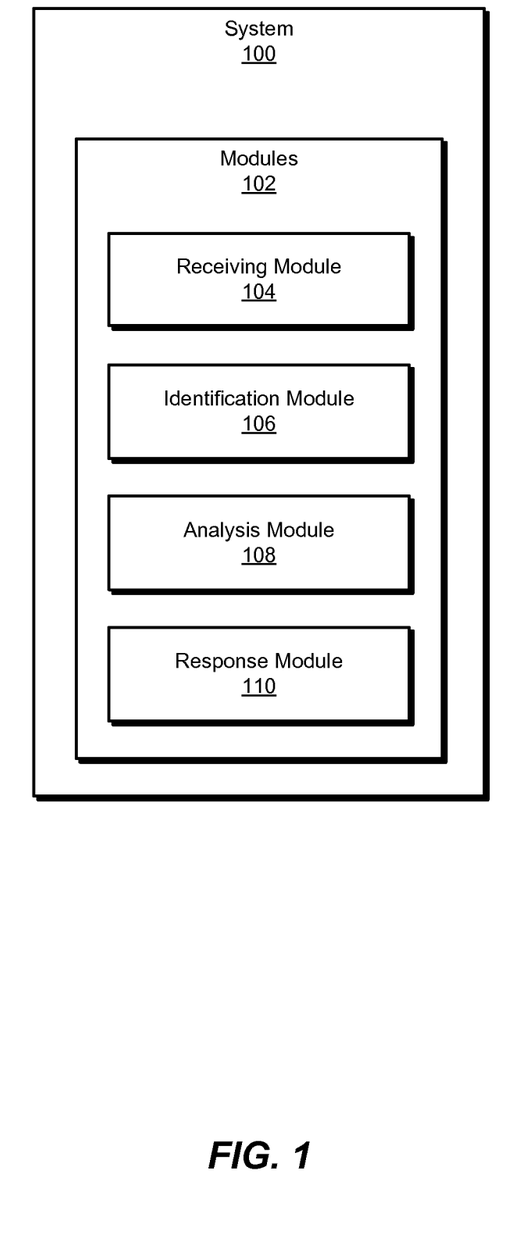
FIG. 1 is a block diagram of an exemplary system for fetching troubleshooting data.
Figure 2:
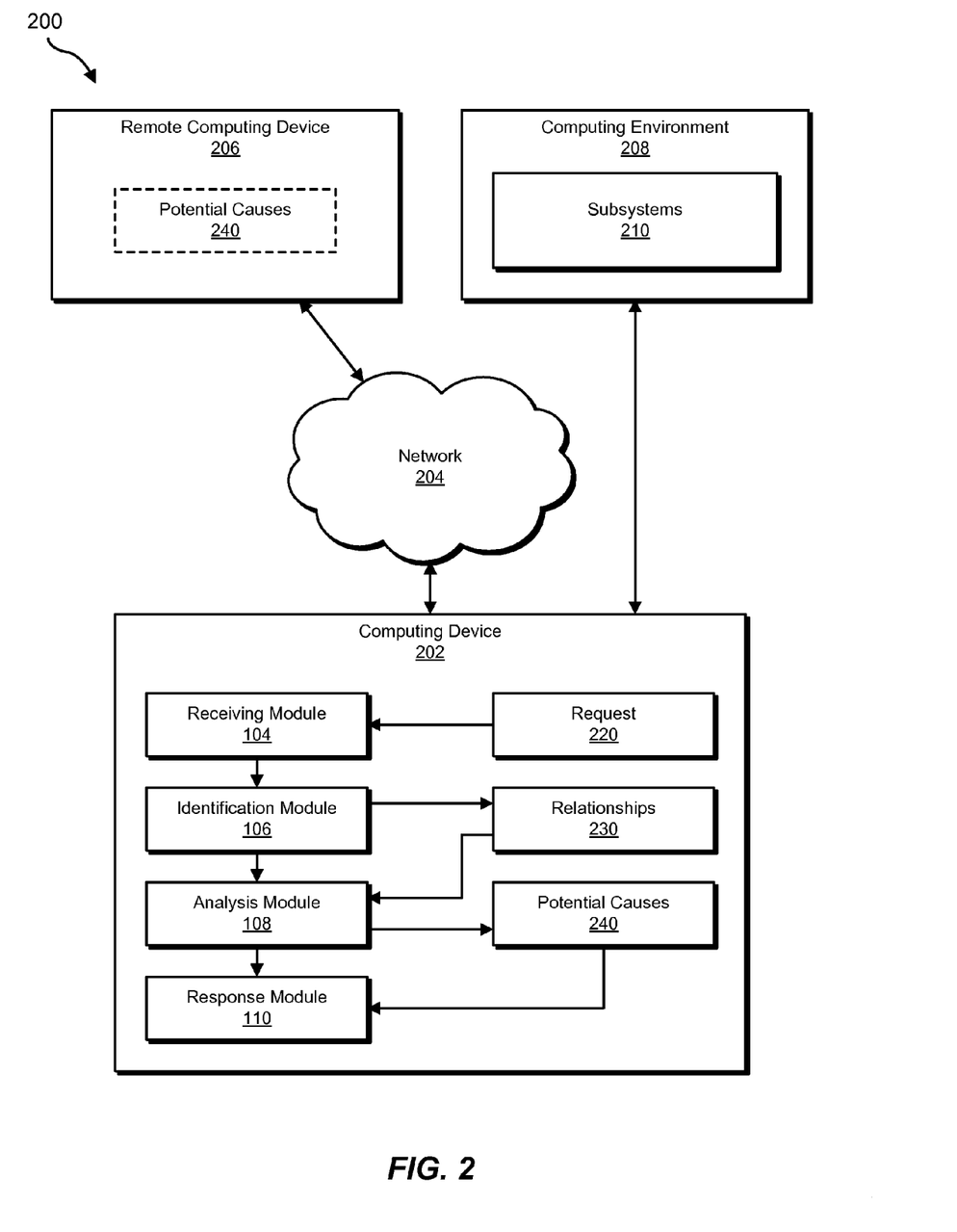
FIG. 2 is a block diagram of an exemplary system for fetching troubleshooting data.

The following will provide, with reference to FIGS. 1-2, detailed descriptions of exemplary systems for fetching troubleshooting data. Detailed descriptions of corresponding computer-implemented methods will also be provided in connection with FIG. 3. Detailed descriptions of an exemplary computing environment and exemplary troubleshooting data will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for fetching troubleshooting data. As illustrated in this figure, exemplary system 100 may include one or more modules 102 for performing one or more tasks. For example, and as will be explained in greater detail below, exemplary system 100 may include a receiving module 104 programmed to receive a request for information describing at least one potential cause of a failure within a computing environment. Exemplary system 100 may also include an identification module 106 programmed to, in response to the request, identify a set of relationships between a plurality of subsystems within the computing environment.

In addition, and as will be described in greater detail below, exemplary system 100 may include an analysis module 108 programmed to identify a plurality of potential causes of the failure based on the set of relationships. Exemplary system 100 may also include a response module 110 programmed to respond to the request by providing the plurality of potential causes of the failure. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, remote computing device 206, and/or one or more of subsystems 210 within computing environment 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a remote computing device 206 via a network 204 to provide troubleshooting information about a failure within a computing environment 208.

In one embodiment, receiving module 104, identification module 106, analysis module 108, and/or response module 110 from FIG. 1 may, when executed by at least one processor of computing device 202, facilitate computing device 202 in fetching troubleshooting data (e.g., for remote computing device 206). For example, and as will be described in greater detail below, one or more of modules 102 may cause computing device 202 to 1) receive a request 220 for information describing at least one potential cause of a failure within computing environment 208, and, in response to request 220, 2) identify relationships 230 between subsystems 210 within computing environment 208, 3) identify potential causes 240 of the failure based on relationships 230, and 4) respond to request 220 by providing potential causes 240 of the failure (e.g., to remote computing device 206).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Remote computing device 206 generally represents any type or form of computing device that is capable of reading computer-executable instructions. Examples of remote computing device 206 include, without limitation, cellular phones, tablet computing devices, personal digital assistants (PDAs), embedded systems, multimedia players, laptops, desktops, servers, combinations of one or more of the same, exemplary computing system 610 in FIG. 6, or any other suitable computing device.

Subsystems 210 within computing environment 208 may represent portions of a single computing system or a plurality of computing systems. For example, subsystems 210 may represent a portion of computing system 610 in FIG. 6 and/or portions of exemplary network architecture 700 in FIG. 7. Alternatively, subsystems 210 in FIG. 1 may represent one or more physically separate devices capable of being accessed by a computing device, such as computing system 610 in FIG. 6 and/or portions of exemplary network architecture 700 in FIG. 7.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and remote computing device 206.

Figure 3:
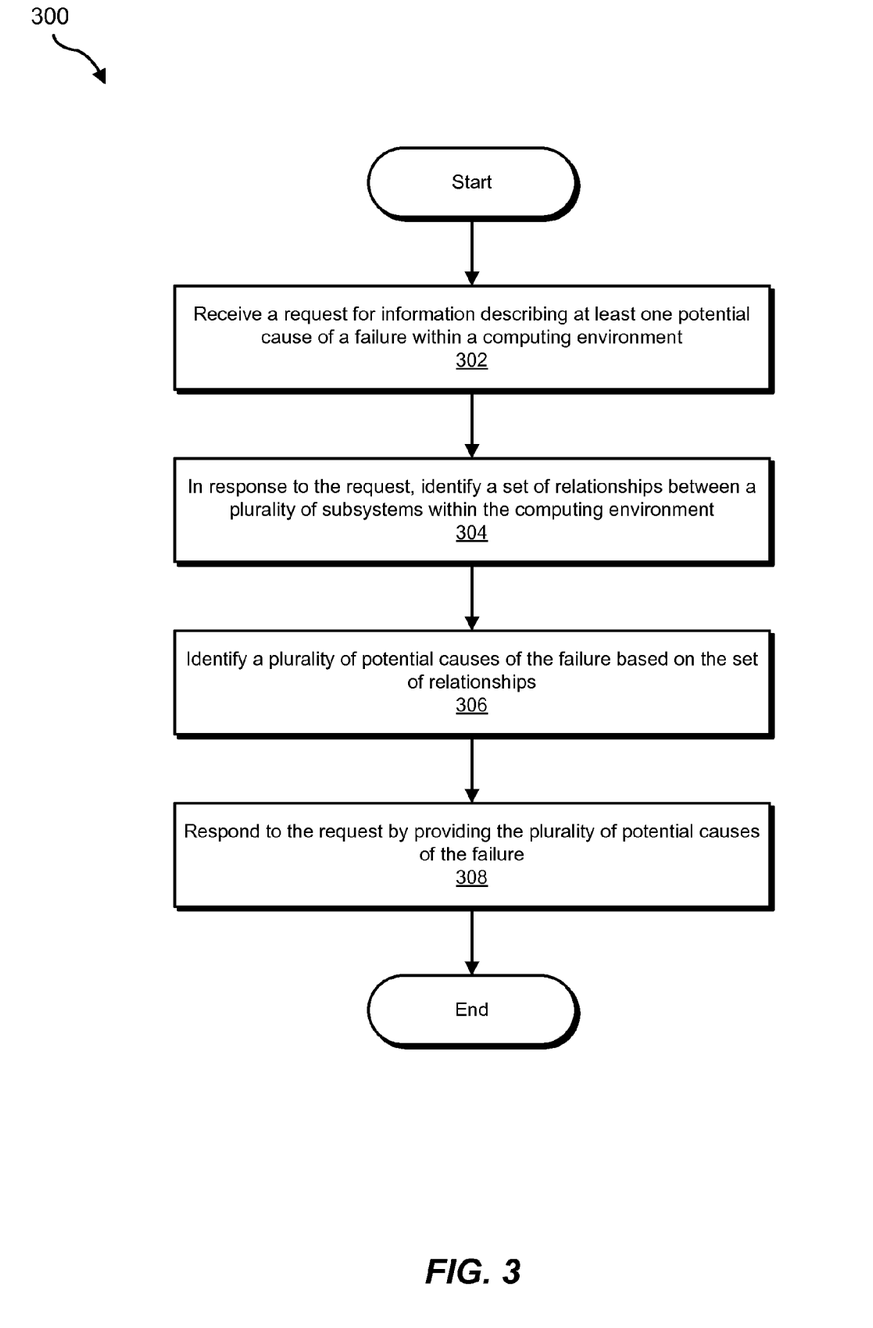
FIG. 3 is a flow diagram of an exemplary method for fetching troubleshooting data.

FIG. 3 is a flow diagram of an exemplary computer-implemented method 300 for fetching troubleshooting data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a request for information describing at least one potential cause of a failure within a computing environment. For example, at step 302 receiving module 104 may, as part of computing device 202 in FIG. 2, receive a request 220 for information describing at least one potential cause of a failure within computing environment 208.

As used herein, the phrase "computing environment" may refer to any collection and/or system of interoperating computing subsystems. As used herein, the term "subsystem" may refer to any application, computing service, computing resource, and/or computing device capable of interacting with, providing data to, receiving data from, using a capability of, and/or providing a capability to a user and/or other subsystem. Examples of subsystems may include, without limitation, a storage system (e.g., a physical storage device, a logical storage volume, a storage service, allocated storage capacity, etc.), a networking system (e.g., a physical network device, a logical network device, a networking service, allocated network bandwidth, etc.), a process (e.g., a service, an application, a module, a component within a multi-tier application, etc.), and a service group.

As used herein, the term "failure" may refer to an error, warning, fault, unexpected state, undesired state, and/or state of interest identified within and/or suspected of existing within a computing environment. Accordingly, a potential cause of a failure may include any of a variety of events, states, and/or faults. For example, a potential cause of a failure may include an inoperability of a resource and/or service, an incorrect operation of a resource and/or service, an insufficient capacity of a resource and/or service, and/or a fulfillment of request behind schedule.

Receiving module 104 may receive the request in any of a variety of contexts. For example, receiving module 104 may receive and/or identify a report of an error within the computing environment (e.g., generated and sent by an application within the computing environment). Additionally or alternatively, receiving module 104 may receive a request generated with user-supplied information (e.g., an administrator may create a report of and/or query regarding an error within the computing device).

Receiving module 104 may receive the request from any of a variety of sources. In some examples, receiving module 104 may receive the request from a remote location (e.g., a location remote from the computing environment and/or a computing device configured to execute receiving module 104). Additionally or alternatively, receiving module 104 may receive the request from a mobile computing device. In some examples, one or more of the systems described herein may perform one or more of the steps described herein in response to determining that the request was received from a remote computing device and/or a mobile computing device.

Returning to FIG. 3, at step 304 one or more of the systems described herein may, in response to the request, identify a set of relationships between a plurality of subsystems within the computing environment. For example, at step 304 identification module 106 may, as part of computing device 202 in FIG. 2, in response to request 220, identify relationships 230 between subsystems 210 within computing environment 208.

As used herein, the term "relationship" as applied to two or more subsystems may refer to any logical connection, dependency, and or standard of interoperation between two or more subsystems. For example, a relationship between two subsystems may include, without limitation, the use of a resource by a subsystem, the use of a service by a subsystem, a designated communication channel between two or more services and/or applications, and a set of expected states held by one subsystem in reference to another subsystem. In some examples, the term "relationship" may refer to one or more possible states of one subsystem that are implied by one or more states of at least one other subsystem (e.g., a failure in one subsystem implying one or more states in one or more other subsystems).

Identification module 106 may identify the set of relationships in any of a variety of ways. For example, identification module 106 may scan the computing environment to generate a logical topology and/or dependency map to determine the set of relationships. Additionally or alternatively, identification module 106 may parse one or more configuration files that define one or more relationships within the computing environment. In some examples, identification module 106 may identify one or more anticipated relationships defined within a troubleshooting database and/or pre-existing relationship map.

Figure 4:
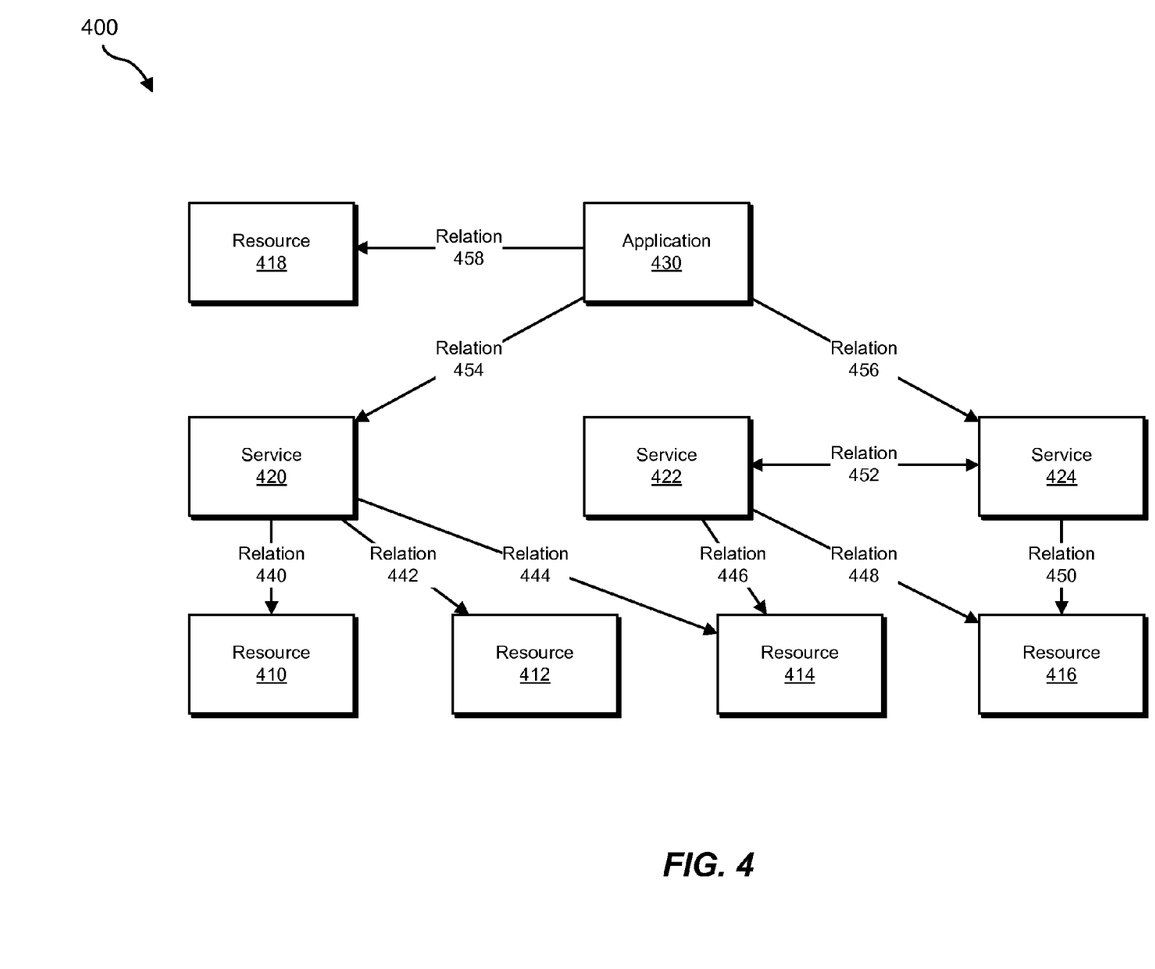
FIG. 4 is a block diagram of an exemplary computing environment.

FIG. 4 is a diagram of an exemplary computing environment 400. As shown in FIG. 4, computing environment 400 may include resources 410, 412, 414, 416, and 418, services 420, 422, and 424, and an application 430. In some examples, one or more of the elements shown in computing environment 400 may interoperate, include dependencies, and/or maintain implied correlations between their respective states. For example, relations 440, 442, and 444 may describe dependencies of service 420 on resources 410, 412, and 414, respectively. Likewise, relations 446 and 448 may describe dependencies of service 422 on resources 414 and 416, respectively. Relation 450 may describe a dependency of service 424 on resource 416. Relation 452 may describe an interoperation between services 422 and 424. Relations 454, 456, and 458 may describe dependencies of application 430 on service 420, service 424, and resource 418, respectively. Using FIG. 4 as an example, at step 304 identification module 106 may identify relations 440, 442, 444, 446, 448, 450, 452, 454, 456, and 458 between the various elements of computing environment 400.

Returning to FIG. 3, at step 306 one or more of the systems described herein may, in further response to the request, identify a plurality of potential causes of the failure based on the set of relationships. For example, at step 306 analysis module 108 may, as part of computing device 202 in FIG. 2, identify potential causes 240 of the failure based on relationships 230.

Analysis module 108 may identify the plurality of potential causes based on the set of relationships in any of a variety of ways. For example, analysis module 108 may identify the plurality of potential causes by iteratively generating a dependency tree starting from the failure by identifying each subsystem within the plurality of subsystems with a potential direct causal relationship with the failure or a previously identified subsystem within the dependency tree. For example, analysis module 108 may, for each node of the dependency tree (e.g., each node that has not yet been analyzed), identify a potential fault in the node relating to the failure (e.g., an application, service, resource, and/or device in which the failure occurred) and identify each subsystem within the plurality of subsystems capable of contributing to the potential fault. Analysis module 108 may then add each such subsystem as a node in the dependency tree. In some examples, analysis module 108 may also retrieve relevant state information from each subsystem as it is added to the dependency tree. For example, analysis module 108 may retrieve state information from a subsystem to determine the nature of a fault in the subsystem and/or to identify any other subsystems that contributed to the state of the subsystem.

In some examples, analysis module 108 may continue gathering information from the computing environment even after a potential cause of the failure has been identified. Accordingly, analysis module 108 may identify multiple potential causes of the failure.

Using FIG. 4 as an example, application 430 within computing environment 400 may generate an error. An administrator may receive a report of the error and then query (e.g., from a remote mobile computing device) one or more of the systems described herein for information on the error. Analysis module 108 may retrieve state information from application 430 and determine that relations 454 and 456 could be implicated in the error. Analysis module 108 may then retrieve state information regarding services 420 and 424 and determine that relations 442, 444, and/or 452 could be implicated in the error. Analysis module 108 may also analyze service 422 and determine that relation 446 could be implicated in the error. Analysis module 108 may then retrieve state information regarding resources 412 and 414.

Figure 5:
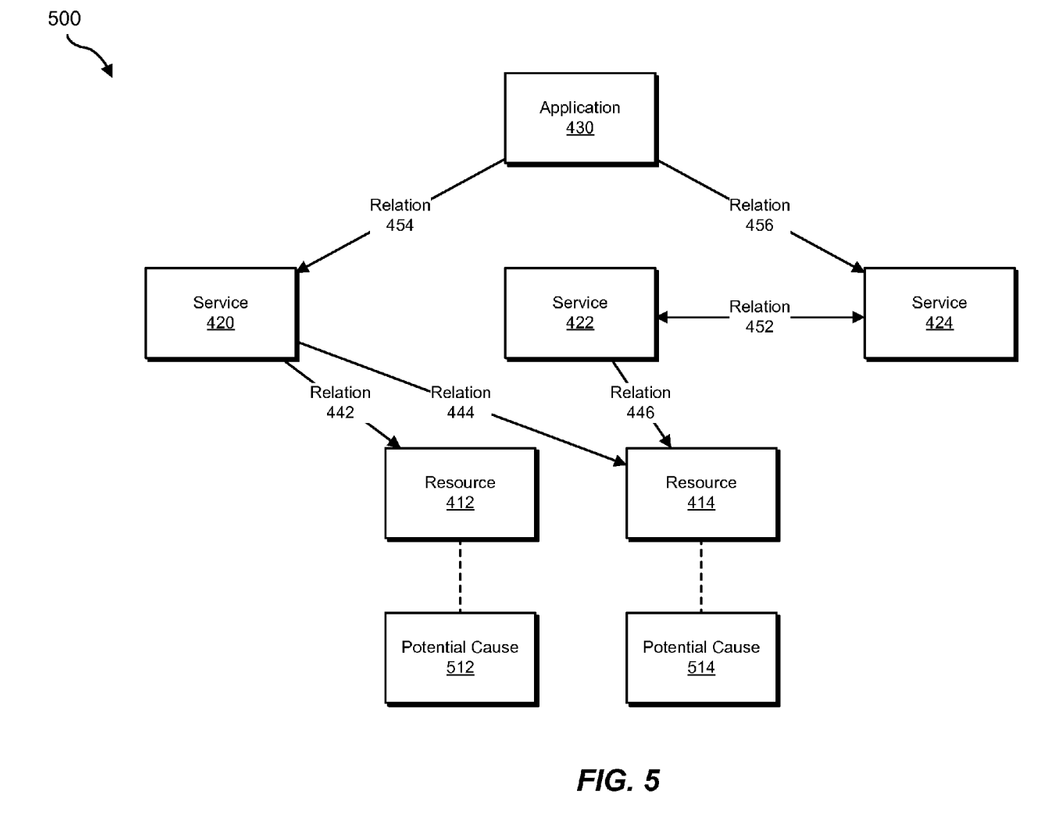
FIG. 5 is a block diagram of exemplary troubleshooting data.

FIG. 5 is a diagram of exemplary troubleshooting information 500. As shown in FIG. 5, troubleshooting information 500 may include a partial relationship map of computing environment 400. For example, troubleshooting information 500 may include information on each implicated relation and element in computing environment 400 as described in the example above. Accordingly, analysis module 108 may analyze the state information of resources 412 and 414 and identify potential causes 512 and 514 of the error in application 430.

Returning to FIG. 3, at step 308 one or more of the systems described herein may respond to the request by providing the plurality of potential causes of the failure. For example, at step 308 response module 110 may, as part of computing device 202 in FIG. 2, respond to request 220 by providing potential causes 240 of the failure (e.g., to remote computing device 206).

Response module 110 may provide the plurality of potential causes of the failure in any suitable format. For example, response module 110 may provide a dependency tree starting from the failure and tracing a plurality of potential causal paths of the failure across a subset of the plurality of subsystems. Using FIG. 5 as an example, response module 110 may provide information identifying one or more of services 420, 422, and 424 and resources 412 and 414, state information of one or more of these services and resources, errors identified within one or more of these services and resources, and/or one or more of the relations depicted in FIG. 5.

In some examples, response module 110 may provide the plurality of potential causes of the failure in a single message. For example, response module 110 may provide the plurality of potential causes of the failure in response to a single query (e.g., the request) instead of providing one or more of the potential causes iteratively over multiple query-and-response sessions.

As mentioned earlier, response module 110 may include information relating to relevant subsystems and relationships in the response. In some examples, response module 110 may limit information sent to the relevant subsystems and relationships. For example, response module 110 may selecting a subset of the plurality of subsystems that includes subsystems within the plurality of subsystems implicated in at least one potential cause within the plurality of potential causes. Response module 110 may also selecting a subset of the set of relationships including relationships within the set of relationships implicated in at least one potential cause within the plurality of potential causes. Response module 110 may then transmit the subset of the plurality of subsystems and the subset of the set of relationships without transmitting the plurality of subsystems and the set of relationships. Using FIGS. 4 and 5 as an example, response module 110 may transmit information regarding the services, resources, and relations depicted in FIG. 5 without transmitting information regarding all of the resources and relations depicted in FIG. 4. For example, response module 110 may not transmit information regarding resources 410, 416, 418 or relations 440, 448, 450, or 458.

In some examples, response module 110 may respond to the request by responding to a mobile computing device. In these examples, response module 110 may provide the plurality of potential causes of the failure to the mobile computing device in a format configured to display subsystems within the plurality of subsystems that are implicated in one or more of the potential causes of failure within the plurality of potential causes of failure instead of each subsystem within the plurality of subsystems. For example, response module 110 may tailor the response to include one or more subsystems and relations implicated in the failure (e.g., directly or indirectly) and to exclude one or more subsystems and relations analyzed but not found to be implicated in the failure. In some examples, response module 110 may tailor the response based on a determination that the response is directed to a mobile computing device and/or a computing device with a limited display and/or interface capacity.

As explained above, by providing information about multiple possible causes of a failure (e.g., in response to a single request), the systems and methods described herein may facilitate an efficient transfer of relevant troubleshooting information to an administrator. Accordingly, in some examples an administrator operating remotely (e.g., using a mobile computing device) may receive all relevant information about potential failure points at once rather than introducing a wait (e.g., due to latency of remote communications) at each step of an investigation into a failure. Additionally, in some examples, an administrator operating remotely may receive only relevant information, thereby decreasing time and resources consumed in transferring and loading the information and also potentially providing the information in a format that is more usable on mobile computing devices with limited display and/or interface capabilities. Furthermore, by providing information about multiple possible causes of a failure, the systems and methods described herein may provide more complete information than a root-cause analysis designed to find a single point of failure.

Figure 6:
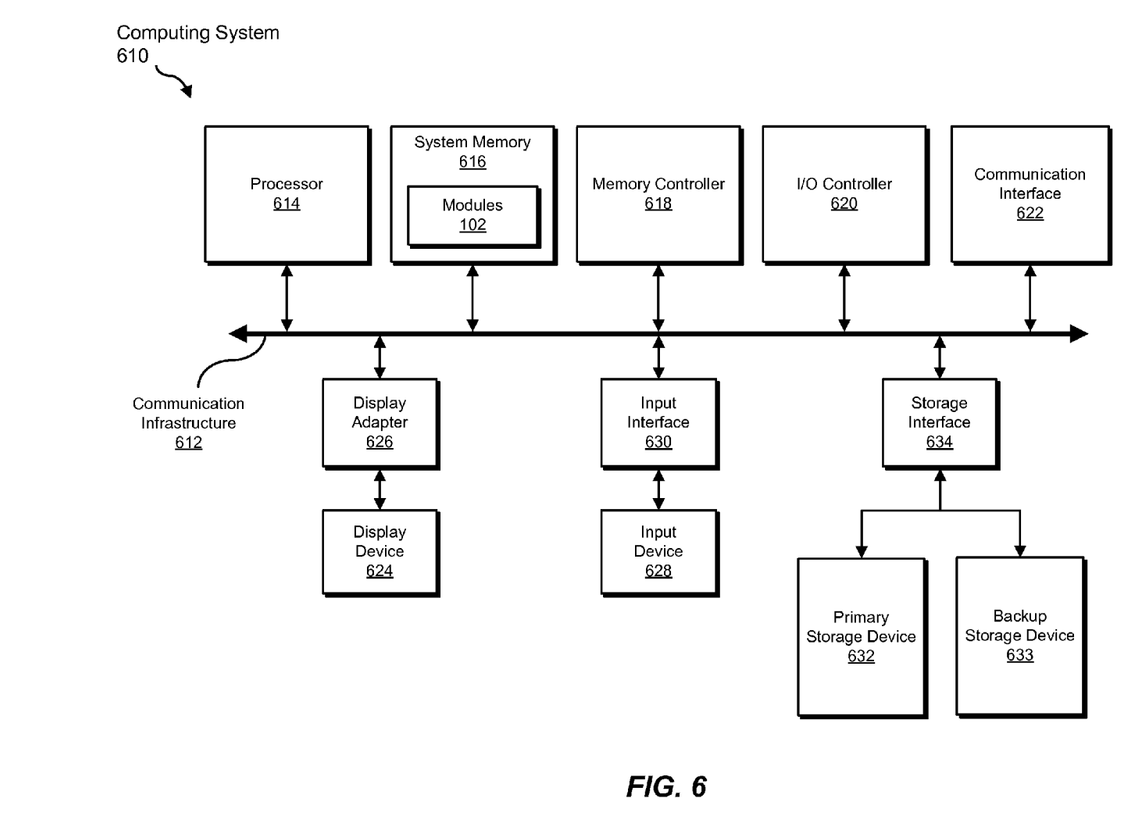
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the receiving, identifying, generating, providing, selecting, transmitting, and responding steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
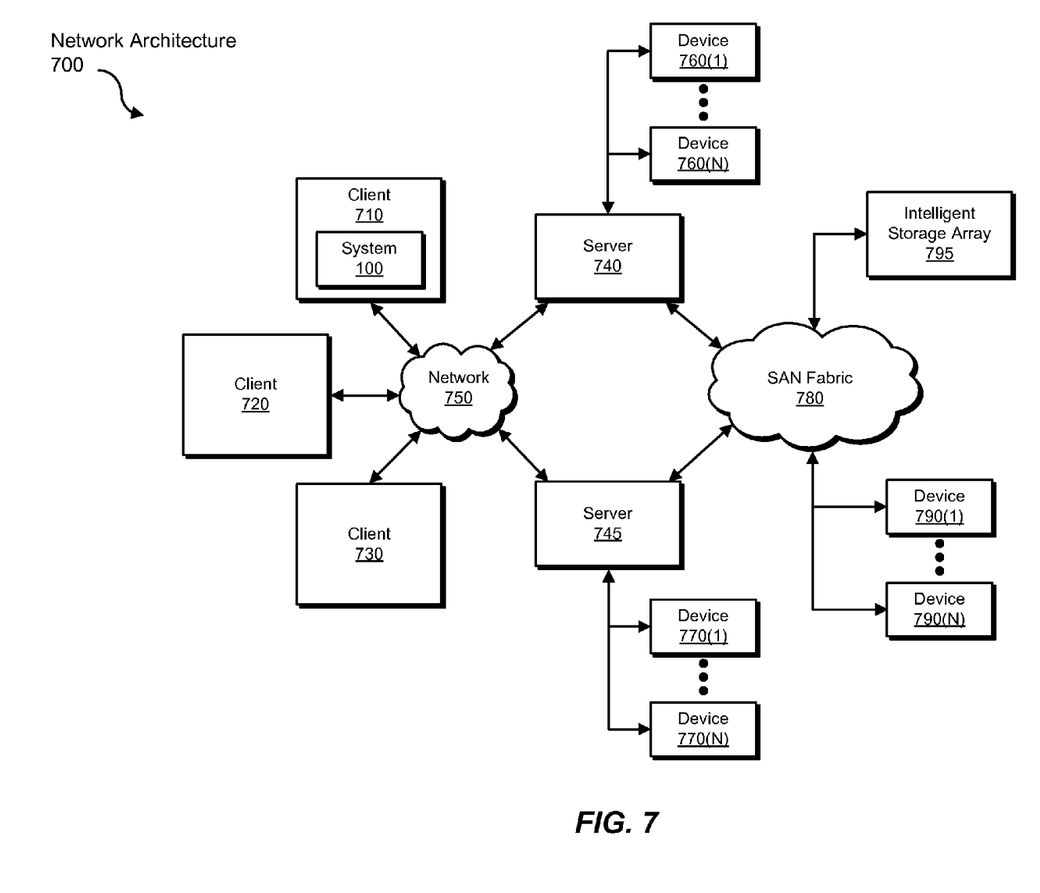
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, identifying, generating, providing, selecting, transmitting, and responding steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for fetching troubleshooting data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for fetching troubleshooting data. As another example, one or more of the modules recited herein may transform a computing system into a system for processing and providing troubleshooting data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for fetching troubleshooting data, at least a portion of the method being performed by a computing device comprising at least one processor, the method comprising:
    receiving a request for information describing at least one potential cause of a failure within a computing environment;
    in response to the request:
        identifying a set of relationships between a plurality of subsystems within the computing environment;
        identifying a plurality of potential causes of the failure based on the set of relationships;
        responding to the request by providing the plurality of potential causes of the failure by:
            selecting a subset of the plurality of subsystems comprising subsystems within the plurality of subsystems implicated in at least one potential cause within the plurality of potential causes;
            selecting a subset of the set of relationships comprising relationships within the set of relationships implicated in at least one potential cause within the plurality of potential causes;
            transmitting the subset of the plurality of subsystems and the subset of the set of relationships without transmitting the plurality of subsystems and the set of relationships.

2. The computer-implemented method of claim 1, wherein identifying the plurality of potential causes of the failure based on the set of relationships comprises iteratively generating a dependency tree starting from the failure by identifying each subsystem within the plurality of subsystems with a potential direct causal relationship to at least one of the failure and a previously identified subsystem within the dependency tree.

3. The computer-implemented method of claim 2 wherein iteratively generating the dependency tree comprises:
    for each node of the dependency tree:
        identifying a potential fault in the node relating to the failure;
        identifying each subsystem within the plurality of subsystems capable of contributing to the potential fault.

4. The computer-implemented method of claim 1, wherein providing the plurality of potential causes comprises providing a dependency tree starting from the failure and tracing a plurality of potential causal paths of the failure across a subset of the plurality of subsystems.

5. The computer-implemented method of claim 1, wherein responding to the request by providing the plurality of potential causes of the failure comprises providing the plurality of potential causes of the failure in a single message.

6. The computer-implemented method of claim 1, wherein:
receiving the request comprises receiving the request from a mobile computing device;
responding to the request comprises responding to the mobile computing device.

7. The computer-implemented method of claim 6, wherein responding to the request comprises providing the plurality of potential causes of the failure to the mobile computing device in a format configured to display subsystems within the plurality of subsystems that are implicated in one or more of the potential causes of failure within the plurality of potential causes of failure instead of each subsystem within the plurality of subsystems.

8. A system for fetching troubleshooting data, the system comprising:
a receiving module programmed to receive a request for information describing at least one potential cause of a failure within a computing environment;
an identification module programmed to, in response to the request, identify a set of relationships between a plurality of subsystems within the computing environment;
an analysis module programmed to identify a plurality of potential causes of the failure based on the set of relationships;
a response module programmed to respond to the request by providing the plurality of potential causes of the failure by:
selecting a subset of the plurality of subsystems comprising subsystems within the plurality of subsystems implicated in at least one potential cause within the plurality of potential causes;
selecting a subset of the set of relationships comprising relationships within the set of relationships implicated in at least one potential cause within the plurality of potential causes;
transmitting the subset of the plurality of subsystems and the subset of the set of relationships without transmitting the plurality of subsystems and the set of relationships;
at least one processor configured to execute the receiving module, the identification module, the analysis module, and the response module.

9. The system of claim 8, wherein the analysis module is programmed to identify the plurality of potential causes of the failure based on the set of relationships by iteratively generating a dependency tree starting from the failure by identifying each subsystem within the plurality of subsystems with a potential direct causal relationship to at least one of the failure and a previously identified subsystem within the dependency tree.

10. The system of claim 9, wherein the analysis module is programmed to iteratively generate the dependency tree by, for each node of the dependency tree:
identifying a potential fault in the node relating to the failure;
identifying each subsystem within the plurality of subsystems capable of contributing to the potential fault.

11. The system of claim 8, wherein the response module is programmed to provide the plurality of potential causes by providing a dependency tree starting from the failure and tracing a plurality of potential causal paths of the failure across a subset of the plurality of subsystems.

12. The system of claim 8, wherein the response module is programmed to respond to the request by providing the plurality of potential causes of the failure comprises providing the plurality of potential causes of the failure in a single message.

13. The system of claim 8, wherein:
the receiving module is programmed to receive the request from a mobile computing device;
the response module is programmed to respond to the request by responding to the mobile computing device.

14. The system of claim 13, wherein the response module is programmed to respond to the request by providing the plurality of potential causes of the failure to the mobile computing device in a format configured to display subsystems within the plurality of subsystems that are implicated in one or more of the potential causes of failure within the plurality of potential causes of failure instead of each subsystem within the plurality of subsystems.

15. A non-transitory computer-readable-storage medium comprising one or more computer-executable instructions that, when executed by at least one processor of a computing device, cause the computing device to:
receive a request for information describing at least one potential cause of a failure within a computing environment;
in response to the request:
identify a set of relationships between a plurality of subsystems within the computing environment;
identify a plurality of potential causes of the failure based on the set of relationships;
respond to the request by providing the plurality of potential causes of the failure by:
selecting a subset of the plurality of subsystems comprising subsystems within the plurality of subsystems implicated in at least one potential cause within the plurality of potential causes;
selecting a subset of the set of relationships comprising relationships within the set of relationships implicated in at least one potential cause within the plurality of potential causes;
transmitting the subset of the plurality of subsystems and the subset of the set of relationships without transmitting the plurality of subsystems and the set of relationships.

16. The computer-readable-storage medium of claim 15, wherein the one or more computer-executable instructions cause the computing device to identify the plurality of potential causes of the failure based on the set of relationships by causing the computing device to iteratively generate a dependency tree starting from the failure by identifying each subsystem within the plurality of subsystems with a potential direct causal relationship to at least one of the failure and a previously identified subsystem within the dependency tree.

17. The computer-readable-storage medium of claim 16, wherein the one or more computer-executable instructions cause the computing device to iteratively generate the dependency tree by causing the computing device to, for each node of the dependency tree:
identify a potential fault in the node relating to the failure;
identify each subsystem within the plurality of subsystems capable of contributing to the potential fault.

18. The computer-readable-storage medium of claim 15, wherein the one or more computer-executable instructions cause the computing device to provide the plurality of potential causes by causing the computing device to provide a dependency tree starting from the failure and tracing a plurality of potential causal paths of the failure across a subset of the plurality of subsystems.

19. The computer-readable-storage medium of claim 15, wherein the one or more computer-executable instructions cause the computing device to respond to the request by providing the plurality of potential causes of the failure by causing the computing device to provide the plurality of potential causes of the failure in a single message.

20. The computer-readable-storage medium of claim 15, wherein:
 receiving the request comprises receiving the request from a mobile computing device;
 responding to the request comprises responding to the mobile computing device.

\* \* \* \* \*